United States Patent
Flake

(10) Patent No.: US 6,567,412 B1
(45) Date of Patent: May 20, 2003

(54) HOLDING A CONNECTION IN AN ISDN NETWORK WITH A DECT INTERMEDIATE SYSTEM

(75) Inventor: Horst Flake, Oberhaching (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/403,666
(22) PCT Filed: Apr. 22, 1998
(86) PCT No.: PCT/DE98/01131
§ 371 (c)(1),
(2), (4) Date: Oct. 25, 1999
(87) PCT Pub. No.: WO98/48589
PCT Pub. Date: Oct. 29, 1998

(30) Foreign Application Priority Data

Apr. 24, 1997 (DE) .......................... 197 17 365

(51) Int. Cl.$^7$ .............................. H04L 12/28
(52) U.S. Cl. ...................... 370/401; 370/465
(58) Field of Search ................. 370/383, 385, 370/386, 392, 393, 395.2, 395.3, 395.31, 395.54, 401, 402, 409, 465, 469, 522

(56) References Cited

U.S. PATENT DOCUMENTS 5,938,735 A * 8/1999 Malik .................... 709/238
6,041,103 A * 3/2000 La Porta et al. ........... 379/67.1

FOREIGN PATENT DOCUMENTS

| DE | 44 14 554 | 11/1995 |
| DE | 195 02 641 | 7/1996 |
| WO | 93/21719 | 10/1993 |
| WO | 96/39785 | 12/1996 |

OTHER PUBLICATIONS

Ip et al., "Cordless Access to the ISDN basic rate service", UK Teletraffic Symposium, pp. 29/1–29/7.

* cited by examiner

Primary Examiner—Wellington Chin
Assistant Examiner—Brenda Pham
(74) Attorney, Agent, or Firm—Staas & Halsey LLP

(57) ABSTRACT

In a method for operating a connection in an ISDN network (NE) by integrating at least one DECT intermediate system (IS) in which, from the protocol of the connections, the triplet (terminal address (TE 1)/call identification (CR 2)/identifier of the transmission service (BC 1)) for each connection is stored in a list in the DECT intermediate system, it is provided that, upon the arrival of the confirmation (HOLD ACK) for the holding of a connection, this triplet (TEI 1/CR 2/BC 1) is marked; upon the arrival of a confirmation (RETR ACK) of the reactivation of a connection under the same terminal address (TEI 1), the marked call identification (CR 2) is searched for in the list; and then a DECT connection is made available, which connection corresponds to the identifier of the transmission service (BC 1) of the marked triplet (TE 1/CR 2/BC 1), and finally the marker (X) is erased again.

7 Claims, 1 Drawing Sheet

HOLDING A CONNECTION IN AN ISDN NETWORK WITH A DECT INTERMEDIATE SYSTEM

BACKGROUND OF THE INVENTION

1. Field of the Invention

The present invention relates to a method for operating a connection in an ISDN network by integrating at least one intermediate system in which connections are led between subscribers of the ISDN network, whereby the protocols contain a terminal address, a caller identification and an identifier of the transmission service, among other things, the terminal address, caller identity and identifier of the transmitting service from the protocol being stored in a list in the intermediate system for each connection.

In the same way, the invention relates to an intermediate system which is integrated into an ISDN network, wherein connections are led between subscribers of the ISDN network via the intermediate system, and wherein a list is provided in the intermediate system for purposes of storing the terminal address, the caller identification and the identifier of the transmission service from the protocol for each connection.

2. Description of the Related Art

The ISDN communication system (Integrated Services Digital Network) is distinguished, among other ways, in that a number of auxiliary services can be made available by the network operator, the holding of connections being the service of interest here. In this auxiliary service, an existing connection can be shifted into hold mode by a subscriber and reactivated later.

The channel structure in ISDN comprises two useful channels called B channels, each with 64 kpbs, as well as one control channel, called D channel, with 16 kbps. The B channels serve for the transmission of useful information, namely data, voice or 3.1 kHz audio, whereas the D channel transmits control information. At a base terminal, called the $S_o$ interface, up to eight terminal devices can be connected; a connection can exist via each B channel, that is, two connections simultaneously per base terminal. The ISDN system provides three protocol layers, layer 3 serving for purposes of connection control (connection setup and dismantling by means of call identification and identification of the transmission service, controlling of auxiliary services), layer 2 serving for terminal addressing, securing transmission, etc., and layer 1 serving for the physical transmission of all information in the B/D channels via the extension circuit.

The DECT (Digital Enhanced Cordless Telecommunications) standard was created for wireless communication over short distances and is used primarily for cordless telephones, or respectively, facilities. Basically, a radio connection is set up between a stationary part, which is connected to the stationary network, and one or more mobile parts, a useful channel with 32 kbps and a control channel with 2 kpbs usually being provided. DECT connections can also be utilized in a stationary manner between an interface of an ISDN network and the $S_o$ interface at the subscriber side, particularly when a cable connection cannot be installed for structural reasons or would be more expensive than the radio connection.

It is thus desirable to produce, or respectively, to maintain an ISDN connection with an intermediately connected DECT connection, while limiting the performance features present in the ISDN system as little as possible. The invention is particularly concerned with the problem of making available the ISDN auxiliary service "hold (connections)" when the connection is running via a DECT intermediate system (or several DECT intermediate systems). The ISDN protocol for "hold" does not contain the parameters for identifying the transmission service in its data packets, this parameter being unnecessary, since the B channel structure in the ISDN system (64 kbps) supports all services.

The intermediate connecting of a DECT system would only enable this channel transparency if the DECT system was also based on a 64 kbps channel structure. But this is ruled out by the channel economy required in the DECT system.

SUMMARY OF THE INVENTION

It is thus an object of the invention to guarantee the auxiliary service "hold" in an ISDN network even given the integrating of one or more intermediate systems, meaning primarily DECT intermediate systems, though it should also be possible to integrate other systems, be they wirebound or wireless.

This object is inventively achieved in a method of the type cited above in that, upon the arrival of the confirmation for holding a connection, the triplet (terminal address/call identification/identification of the transmission service) is marked; upon the arrival of a confirmation of the reactivation of a connection under the same terminal address, the marked call identification is searched for in the list, and a connection of the intermediate system which corresponds to the identification of the transmission service of the marked triplet is made available; and finally, the mark is erased.

The invention guarantees that in the restoring of a held connection, the intermediate system recovers the appertaining transmission service via a comparison of the stored and marked parameters.

It is expedient when the intermediate system is a DECT intermediate system and when connections between subscribers of the ISDN network are led via a first DECT station, an air radio link, and a second DECT station.

It is advantageous if, in the holding of a connection in the transmission service "unlimited digital information", the corresponding bandwidth is also held available for voice connections, and a modification onto half bandwidth is prevented.

It may also be expedient when a DECT channel that is already available is allocated to the connection that is to be reactivated, or respectively, when a new and appropriate DECT channel is selected for the connection that is to be switched back.

An intermediate system of the above described type is inventively characterized for purposes of achieving the inventive object in that the intermediate system and the list are designed to provide the triplet (terminal address/call identification/identification) of the transmission service with a mark upon the arrival of the confirmation for holding a connection, to search out the marked call identification in the list upon the arrival of a confirmation of a reactivation of a connection under the same terminal address, to make available a connection of the intermediate system which corresponds to the identification of the transmission service of the marked triplet, and to erase the mark.

It is advantageous here when the intermediate system is a DECT intermediate system, whereby the connections between subscribers of the ISDN network are led via a first DECT station, an air radio link, and a second DECT station, and a DECT station, and when a DECT station and the list are designed to provide the triplet (terminal address/call identification/identification) of the transmission service with a mark upon the arrival of the confirmation for holding a connection, to search out the marked call identification in the list upon the arrival of a confirmation of a reactivation of a connection under the same terminal address, to make available a DECT connection which corresponds to the identification of the transmission service of the marked triplet, and to erase the mark.

BRIEF DESCRIPTION OF THE DRAWINGS

The invention and all of its advantages are detailed below with reference to the drawing, in which appear.

DETAILED DESCRIPTION OF THE PREFERRED EMBODIMENTS

Figure 1:
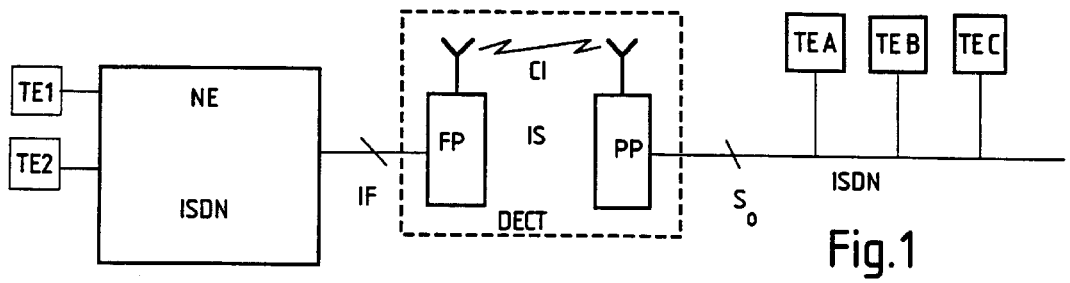
In FIG. 1 is a symbolic block circuit diagram of a telecommunication network with an ISDN system and an intermediately connected DECT system.

FIG. 1 demonstrates that an ISDN network NE is connected via a DECT intermediate system IS to a plurality of endpoints TE A, TE B, TE C, which share an interface $S_o$ in the ISDN standard. Here, the DECT intermediate system IS consists of a stationary part, generally a first DECT station FP, and a mobile part, generally a second DECT station PP, it being possible to set up an air radio link CI between the two stations. Various interfaces, referenced IF here, can be present between the ISDN network NE and the DECT intermediate system IS. Two subscribers TE1, TE2 are depicted as being connected to the network NE.

Figure 2:
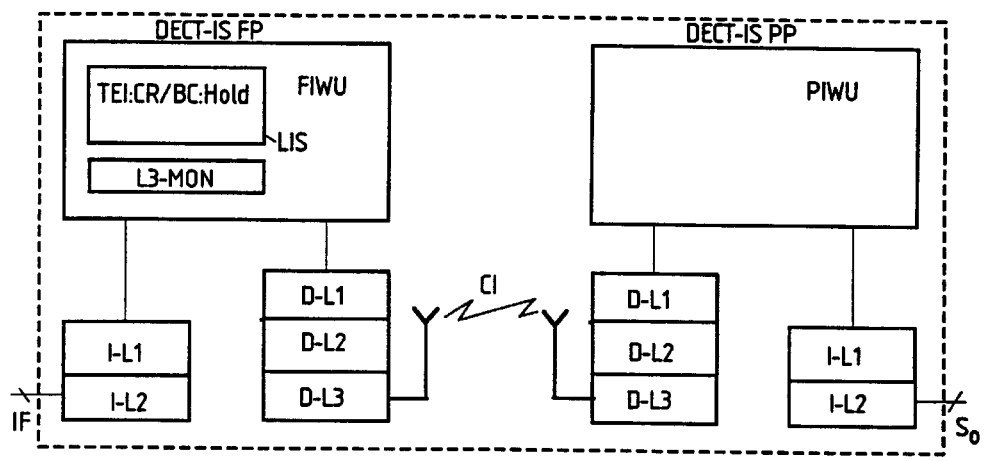
in FIG. 2 is a block circuit diagram of a DECT intermediate system as depicted in FIG. 1

Referring to FIG. 2, it is clear that both the first and second stations FP, or respectively, PP of the DECT intermediate system comprise a working unit FIWU, or respectively, PIWU. In order to be able to correspondingly control the internal DECT functions, the intermediate system IS must have enough information about the current ISDN protocols. In the following and in FIG. 2, the protocol layers in ISDN, or respectively, in the DECT system are referenced I-L1, I-L2 and I-L3, or respectively, D-L1, D-L2, and D-L3. Details about the ISDN system, or respectively, the DECT system, and particularly about the protocol structure in these systems, can be derived from the following literature: ETSI Standards ETS 300 175 and ETS 300 196 as well as ITU recommendations 1.411, Q.921 and Q.931.

In addition to what has already been stated about the protocol layers, it should be noted in the context of the present invention that the ISDN protocol layers L1 and L2 terminate in the stationary and mobile parts FP, PP, and the ISDN protocol layer L3 is extended through the intermediate system basically transparently, the ISDN-L3 packets being "packed" into DECT-L3 packets.

In order to obtain the above information, the DECT intermediate system IS contains an I-L3 monitor function, which is contained in the working unit FIWU of the stationary part FP as block L3-MON in this case and which analyzes the protocol of the ISDN-layer 3 and stores essential parameters for every call. For controlling the DECT system, the working unit FIWU of the stationary part FP has a master function, as opposed to the working unit PIWU of the mobile part PP, which only has a slave function, whereby the working unit FIWU of the stationary part FP controls that of the mobile part PP via D-L3 protocol elements.

Figure 3:
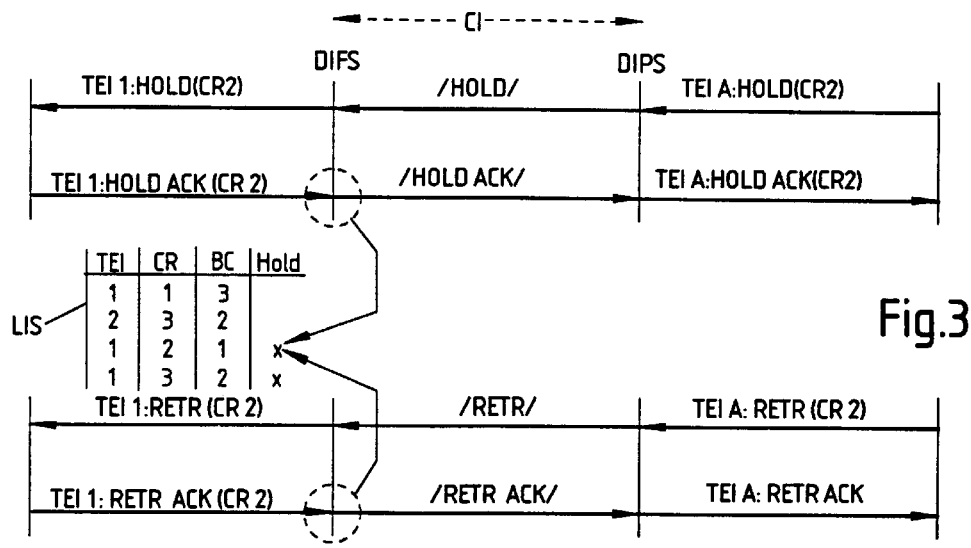
FIG. 3 is a schematic illustration showing the exchange of the hold and switch-back messages and the entering into a list of the DECT intermediate system.

The following describes the setup of a connection between the ISBN network NE via the DECT intermediate system IS and an ISDN system, or respectively, a subscriber (interface So), with reference to FIG. 3.

When the calling subscriber TE A with the terminal identifier, for instance TEI A (subscriber A), picks up at his terminal, the terminal sends a setup message (set up) in the direction of the network. In this setup message, a call identification, for instance CR2, is defined, and the identifier of the transmission service (bearer capabilities) BC is indicated, thus communicating to the network which transmission service is required, for instance the service "voice". In the intermediately placed DECT system IS, the setup message is analyzed, namely by the working unit FIWU in the stationary part FP, whereby it is determined that a subscriber is calling which has the call identification CR2 and the identifier of the transmission service "voice". This triplet TE1-CR2-BC1 is stored in a memory, or respectively, in a list LIS and, according to the specifications, a DECT connection is set up which is suited to transmit voice. The ISDN network that receives this setup message now determines that someone desires a connection. But there is no information available to the network to the effect that a DECT system is intermediately connected.

As in an analog network, the ISDN network now overlays a dial tone and acknowledges the setup message. Accordingly, the network delivers a message "setup confirmation" and requests the subscriber A and the terminal to give dialing information. The DECT system sends through this setup message, which also contains an item of information about the B channel on which this connection is to be based, without modification. The subscriber now inputs the dialing information to the network, which receives the call number. The DECT system sends the corresponding information packet through transparently. Once the network recognizes the dialed number as usable, it delivers what is known as a "call proceed" message to subscriber A.

The called subscriber TE1 is now reached, and it rings there, at which point the has not yet picked up. The subscriber reports this in ISDN protocol level 3 to the network. When the network has established this, it delivers an alert signal ("alerting message") to the calling subscriber TE A. In voice service, this is always accompanied by the corresponding signals in the useful channel. Eventually, the called subscriber TE1 then picks up, and a connected-signal ("connect") is delivered to the calling subscriber TE A; that is, the called subscriber TE 1 is connected, and the call is now in the active state (conversation state) at the called subscriber TE 1.

The setup message goes to the network on the called side. When the network has sufficient dialing information, the network sends a setup message on the calling side to the desired called subscriber. In this message, the network communicates a call identification and the identifier of the transmission service, which is of course the same as on the calling side. The network merely produces the relation to the call identifications, which are present as a very specific bit pattern at a specific point in the protocol.

Since it is possible in an ISDN network to maintain a plurality of separately signaled connections simultaneously, whereby the signaling processes can be superimposed on one another, a call identification is needed in each signaling process, along with a process numbering, which it is possible to assign basically arbitrarily, in order to be able to tell the signaling processes apart. In principle, this call identification is always specified by the one making the call; that is, the subscriber can assign it to the network or vice versa, and all others then refer thereto.

The call identifications are not identical between the calling and called sides, since they are specified locally. The network makes sure that the calls are adapted to each other and delivers a setup message with a call identification and with the desired identifier of the transmission service on the called side as well.

In the ISDN system, up to eight terminal devices can be connected to a base terminal. When all eight terminal devices are compatible with the call, all would check in; that is, all of them would deliver a service signal ("alert"). In fact, the terminal device that picks up first and sends "connected", accordingly, gets the call. It is also possible for several service signals and several "connected" signals to run in parallel; what is crucial is that the terminal device that picks up first receives the call. The network subsequently determines which terminal gets the call by a connection confirmation ("connection acknowledge"), which is sent to the terminal device that receives the call. This is unambiguously defined by the terminal identifier, since each terminal device has a different terminal identifier. The terminal device thus has its service signal and/or its "connected" message always provided with an individual terminal identifier. The first device to check in is thus unambiguously identifiable, and the connection confirmation is delivered to it, whereby all these messages always have the same call identification, since they always refer to the same call. Subsequent to the connection confirmation, the connection is also active at the called subscriber, and the subscribers can communicate with each other.

It should be noted at this point that, in contrast to the illustration according to FIG. 1, a DECT intermediate system may also be present on the called side (here subscriber TE1), at which the triplet TEO-CR-BC is likewise stored in a list.

In a call in the active state, the auxiliary service "hold" can be used. In the course of a conversation of the two subscribers, one subscriber could want to consult another subscriber, for example. The subscribers can arrange this, and one subscriber, for instance TE A, then activates a hold or consult button on his side, which causes the previously existing connection to be switched into hold. This is signaled to the other subscriber TE 1 unambiguously; the connection remains, and the charges accrue to the caller.

The subscriber TE A, which switches to hold, would like to activate a follow-up call and needs a B channel for this purpose. The ISDN system reserves a B channel for this purpose, because otherwise one of the other terminal devices, if there are others connected, could "take away" this channel from the subscriber TE A, who has just switched into hold.

The corresponding explanation of this process follows, with particular reference to FIG. 3. If the subscriber TE A wishes to switch his connection to hold, a hold message HOLD is delivered by his terminal (FIG. 3, top), whereby it is assumed in this example that this hold message HOLD is delivered to the call identification 2.

In the working unit FIWU of the stationary part FP, there is a list LIS, that is, a memory. In this example, it is assumed that several connections run from the interface So in the direction of the network NE. Of these the call identification 2 is newly active for TEI 1. The hold message is now sent thereto; the DECT intermediate system IS transfers it to the stationary part FP, which can examine the message, though it does not need to at the moment. In any case, it forwards the hold message to the network NE, which now executes the corresponding control functions and acknowledges the message positively with a hold confirmation HOLD ACK. The stationary part FP now determines that the call identification 2 is held and marks this call identification 2 in its list LIS under the terminal address TEI1 (network side) with an X marker. The hold confirmation HOLD ACK travels to the subscriber TE 1 via the DECT intermediate system. It may also be the case that the call, or respectively, the function, is rejected, because the performance feature is not functioning, etc. In this case, a hold rejection would arrive instead of a hold confirmation, and the connection would not go to hold.

The information is now present in the DECT information system IS that a connection with the identifier of the transmission service 1 is on hold, and it must make sure that the corresponding identifier of the transmission service is reconstructed when this connection is needed again. The DECT intermediate system IS can hold the connection. It would also be possible to set up a new connection for every follow-up call and to allocate a new DECT channel. However, it is usually more expedient to hold the DECT connection already in existence, to wait for the follow-up call and to check if this still has the same identifier of the transmission service or if it has a different one. If the same identifier of the transmission service is present, the DECT channel can be used again; if another is present, the channel must be modified, or another channel set up. In most cases, the identifier of the transmission service does not change, though a change is not out of the question.

If a voice call were to be made, then the connection were to be put on hold, and finally a PC (computer) were to be called as a third subscriber (e.g. under TE 1, CR 1, BC 3), one would have a data connection which does not present a problem in the ISDN system, since its B channel can support both, namely voice or data connection. However, the DECT intermediate system would now determine that the held channel is suited to the voice connection, but not to the data connection. In this case, a channel for the data connection can be set up, and the channel for the voice connection can be dismantled. But the connection as a whole is held.

Although other modifications and changes may be suggested by those skilled in the art, it is the intention of the inventors to embody within the patent warranted hereon all changes and modifications as reasonably and properly come within the scope of their contribution to the art.

The lower part of FIG. 3 now relates to the case in which the subscriber TE A has completed his consultation and would like to reactivate the original connection. A switch-back message RETR ("RETRIEVE") is then sent from the terminal TE A to the network at the call identification CR 2. In the example illustrated in FIG. 3, for TEI 1 a connection was also held under the call identification 3 in the list; that is, it would also be possible to switch back to the call "no. 3". In any case, it is critical that the intended call identification is inserted into the switch-back. This message travels through the DECT intermediate system IS to the network again; the network confirms or rejects this switch-back message; and the normal case of a confirmation with switch-back confirmation RETR ACK is present at the call identification 2. This is the signal for the DECT intermediate system IS to set up a connection that corresponds to the identifier of the transmission service 1 that is connected to the call identification 2. It is also possible that an entirely different identifier of the transmission service has meanwhile appeared, though the one belonging to the original call must be reconstructed, for which purpose the X in the list LIS is used, since the identifier of the transmission service is not contained in the switch-back message.

The three most important actions can be summarized as follows: recognizing the switch-back message at the terminal identifier TEI 1; searching in the list LIS for the call identification 2; making available the appropriate identifier of the transmission service, here BC 1, as the basis for the DECT connection. The connection is then set up again, and the mark X is erased. If a subscriber should now switch into hold again, the described sequence would repeat.

The invention has been described in connection with a DECT intermediate system; however, it should be clear that other cordless systems also come under consideration, such as cable-bound intermediate systems, etc., for instance with IR transmission paths. Of course, such an intermediate system is predicated on the channel structure not conflicting with the ISDN channel structure, or respectively, on the ability to set up corresponding channel structure during the connection control.

I claim:

1. A method for operating a connection in an ISDN network by integrating at least one intermediate system, in which connections are led between subscribers of the ISDN network, protocols contain a terminal address, a call identification and an identifier of the transmission service and from the protocol, the terminal address, the call identification and the identifier of a transmission service for each connection are stored in a list, comprising the steps of:

upon the arrival of a confirmation for holding of a connection, marking a triplet terminal address/call identification/identifier of the transmission service is, upon the arrival of a confirmation of a reactivation of a connection under a same one of said triplet terminal address, searching for a marked call identification in the list, making available a connection of the at least one intermediate system, said connection corresponding to the identifier of the transmission service of the marked triplet terminal address, and erasing the marker.

2. A method as claimed in claim 1, wherein the intermediate system is a DECT intermediate system, and further comprising the step of:

leading connections between subscribers of the ISDN network via a first DECT station, an air radio link and a second DECT station.

3. A method as claimed in claim 2, further comprising the steps of:

given holding of a connection in the transmission service "unlimited digital information", keeping the corresponding bandwidth for voice connections available, and preventing a modification onto half bandwidth.

4. A method as claimed in claim 2, further comprising the step of:

allocating a DECT channel that is already available to the connection that is switching back.

5. A method as claimed in claim 2, further comprising the step of:

selecting a new and suitable DECT channel for the connection that is switching back.

6. An intermediate system which is integrated in an ISDN network, comprising:

connections between subscribers of the ISDN network led via the intermediate system, and a list in the intermediate system for storing a terminal address, a call identification, and an identifier of the transmission service for each connection from a protocol, the intermediate system and the list being designed to provide the triplet terminal address/call identification/ identifier of the transmission service with a marker upon arrival of a confirmation for holding a connection, to search for a marked call identification in the list given arrival of a confirmation of a reactivation of a connection under the same terminal address, to make available a connection of the intermediate system which corresponds to an identifier of the transmission service of the marked triplet, and to erase the marker again.

7. An intermediate system as claimed in claim 6, comprising:

a DECT intermediate system in which connections between subscribers of the ISDN network are led via a first DECT station, an air radio link and a second DECT station, and in which one of said DECT station and the list are designed to provide the triplet terminal address/ call identification/identifier of the transmission service with a marker upon the arrival of the confirmation for holding a connection, to search for the marked call identification in the list upon the arrival of a confirmation of a reactivation of a connection under the same terminal address, to make available a DECT connection of the intermediate system which corresponds to the identifier of the transmission service of the marked triplet, and to erase the marker again.

* * * * *